(12) United States Patent
Soukup et al.

(10) Patent No.: US 11,646,429 B2
(45) Date of Patent: May 9, 2023

(54) FUEL CELL SYSTEM

(71) Applicant: AVL List GmbH, Graz (AT)

(72) Inventors: Nikolaus Soukup, Hamburg (DE); Martin Hauth, Graz (AT)

(73) Assignee: AVL List GmbH, Graz (AT)

(*) Notice: Subject to any disclaimer, the term of this patent is extended or adjusted under 35 U.S.C. 154(b) by 199 days.

(21) Appl. No.: 17/050,463

(22) PCT Filed: Apr. 26, 2019

(86) PCT No.: PCT/AT2019/060140
§ 371 (c)(1),
(2) Date: Oct. 26, 2020

(87) PCT Pub. No.: WO2019/204849
PCT Pub. Date: Oct. 31, 2019

(65) Prior Publication Data
US 2021/0066731 A1  Mar. 4, 2021

(30) Foreign Application Priority Data
Apr. 26, 2018 (AT) .............................. A 50355/2018

(51) Int. Cl.
*H01M 8/04014* (2016.01)
*H01M 8/04007* (2016.01)
(Continued)

(52) U.S. Cl.
CPC ... *H01M 8/04014* (2013.01); *H01M 8/04067* (2013.01); *H01M 8/04111* (2013.01); *H01M 8/04201* (2013.01)

(58) Field of Classification Search
None
See application file for complete search history.

(56) References Cited

U.S. PATENT DOCUMENTS

2002/0182467 A1* 12/2002 Ballantine ......... H01M 8/04731
429/435
2004/0219401 A1* 11/2004 Hobmeyr ............. F04D 29/706
429/415
(Continued)

FOREIGN PATENT DOCUMENTS

CN  159701      3/2005
CN  105359320   2/2016
(Continued)

OTHER PUBLICATIONS

Internationaer Recherchenbericht und Schriftlicher Bescheid [International Search Report and the Written Opinion] dated Sep. 11, 2019 From the International Searching Authority Re. Application No. PCT/AT2019/060140 and Its Translation of Search Report Into English. (14 Pages).
(Continued)

*Primary Examiner* — Haroon S. Sheikh

(57) ABSTRACT

The present invention relates to a fuel cell system comprising a fuel supply unit, at least one high-temperature fuel cell having a cathode and an anode and an electrolyte between the cathode and anode. The cathode has a cathode supply line and the anode has an anode supply line, wherein the anode is fluidically connected via the anode supply line to the fuel supply unit. Furthermore, a reforming device is arranged in the anode supply line. In addition, an anode exhaust gas line is provided for at least discharging anode exhaust gas from the anode. The fuel cell system has an exhaust gas heat exchanger for cooling exhaust gas and a recirculation conveyor for returning anode exhaust gas to the reforming device. The recirculation conveyor and the exhaust gas heat exchanger are connected to one another in fluid communication for respective cooling via a common cooling circuit, which has a central cooling fluid store as a fluid source with a heat exchanger and in which cooling fluid
(Continued)

can be circulated in a cooling line. In addition, the cooling circuit has at least one pump for conveying cooling fluid. The invention further relates to a method for cooling a fuel cell system.

11 Claims, 3 Drawing Sheets

(51) Int. Cl.
  *H01M 8/04111* (2016.01)
  *H01M 8/04082* (2016.01)

(56) References Cited

U.S. PATENT DOCUMENTS

| | | | |
|---|---|---|---|
| 2005/0118474 A1* | 6/2005 | Ettwein | H01M 8/04029 |
| | | | 429/441 |
| 2005/0196659 A1* | 9/2005 | Grieve | H01M 8/04097 |
| | | | 180/65.21 |
| 2008/0182141 A1 | 7/2008 | Rechberger et al. | |
| 2013/0022888 A1* | 1/2013 | Vollmer | H01M 8/04067 |
| | | | 429/434 |
| 2014/0190173 A1 | 7/2014 | Ozawa | |
| 2014/0322621 A1* | 10/2014 | Patel | H01M 8/04201 |
| | | | 429/415 |
| 2016/0344045 A1 | 11/2016 | Ishino et al. | |

FOREIGN PATENT DOCUMENTS

| | | |
|---|---|---|
| DE | 102010007857 | 8/2011 |
| WO | WO 2019/204849 | 10/2019 |

OTHER PUBLICATIONS

Notification of Office Action and Search Report dated Feb. 20, 2023 From the State Intellectual Property Office of the People's Republic of China Re. Application No. 201980025120.8. (9 Pages).

* cited by examiner

FUEL CELL SYSTEM

RELATED APPLICATIONS

This application is a National Phase of PCT Patent Application No. PCT/AT2019/060140 having International filing date of Apr. 26, 2019, which claims the benefit of priority of Austrian Patent Application No. A50355/2018 filed on Apr. 26, 2018. The contents of the above applications are all incorporated by reference as if fully set forth herein in their entirety.

FIELD AND BACKGROUND OF THE INVENTION

The invention relates to a fuel cell system and to a method for cooling a fuel cell system. The fuel cell system comprises a fuel supply unit, at least one high temperature fuel cell with a cathode and an anode, and an electrolyte which is arranged between the cathode and the anode, the cathode having a cathode feed line, and the anode having an anode feed line, and the anode being flow-connected via the anode feed line to the fuel supply unit. A reforming apparatus is arranged in the anode feed line, and, furthermore, an anode off-gas line for the discharge at least of anode off-gas from the anode is provided.

Electric current can be generated from cathode air and fuel gas or reformate gas by means of the at least one high temperature fuel cell. Here, a fuel cell of this type is usually assembled from a multiplicity of individual fuel cell elements which are stacked on one another and are called a fuel cell stack. A person skilled in the art understands a fuel cell, in particular a high temperature fuel cell, to mean, for example, a solid oxide fuel cell (SOFC). Solid oxide fuel cells are operated at operating temperatures of approximately from 650° C. to 1000° C.

The electrolyte of said cell type consists of a solid ceramic material which is capable of conducting oxygen ions, but has an insulating effect for electrons. The electrodes, in particular the cathode and the anode, are attached on the two sides of the electrolyte layer. They are gas-permeable electric conductors. The oxygen ion-conducting electrolyte is configured, for example, as a thin membrane, in order for it to be possible for the oxygen ions to be transported with low energy at said high temperatures. The outer side of the cathode, which side faces away from the electrolyte, is surrounded by air (called cathode gas, inter alia, in the following text) and the outer anode side is surrounded by fuel gas or reformate gas. Unused air, unused fuel gas and products of combustion are discharged, for example, by way of extraction.

In order to produce reformate gas, the fuel cell system can be equipped with a reforming apparatus which produces the reformate gas from a fuel, usually a hydrocarbon such as natural gas, diesel or an alcohol, and possibly from reformer air and/or water vapor. The reformate gas then comprises, inter alia, hydrogen gas and carbon monoxide. Here, the reforming can take place in a separate reformer apparatus or else in the fuel cell itself. Moreover, the fuel cell system can be equipped with an air supply device which sucks in ambient air from the surrounding area of the fuel cell system by means of an air conveying device and separates said ambient air, for example, into reformer air and cathode air. The reformer air can then be fed to the reformer apparatus, whereas the cathode air can be fed in via the cathode feed line.

In the case of fuel cell systems of the type described at the outset, exhaust gas at a sufficiently high temperature is available. In the case of SOFC systems, in particular, anode off-gas at a temperature of approximately 350° C. is available. It is a disadvantage of known solutions, in particular, that a lot of the energy which is made in the fuel cell escapes unused into the surrounding area as waste heat via the fuel cell stack off-gas or exhaust gas. If a recirculation device is used in the fuel cell system, a hydraulic connection of the heat recovery means is complicated, additional heat exchangers also being required. A further disadvantage is the exergetic loss which is produced in the case of mixing of warm water at different temperatures, if the waste heat recovery takes place in different circuits.

SUMMARY OF THE INVENTION

It is an object of the present invention to at least partially eliminate the above-described disadvantages. In particular, it is an object of the present invention to provide a fuel cell system with improved and efficient cooling. Furthermore, it is an object of the present invention to provide a method for cooling a fuel cell system.

The above object is achieved by way of a fuel cell system with the features of claim 1, and by way of a method for cooling a fuel cell system with the features of claim 8. Further features and details of the invention result from the subclaims, the description and the drawings. Here, it goes without saying that features and details which are described in conjunction with the fuel cell system according to the invention also apply in conjunction with the method according to the invention, and in each case vice versa, with the result that reference is always made or can always be made mutually with regard to the disclosure in respect of the individual aspects of the invention.

In accordance with a first aspect of the invention, the object is achieved by way of a fuel cell system comprising a fuel supply unit, at least one high temperature fuel cell with a cathode and an anode, and an electrolyte which is arranged between the cathode and the anode. The cathode has a cathode feed line, and the anode has an anode feed line, the anode being flow-connected via the anode feed line to the fuel supply unit. Furthermore, a reforming apparatus is arranged in the anode feed line. Furthermore, an anode off-gas line for the discharge at least of anode off-gas from the anode is provided. A remaining combustible part of the anode off-gas can be burned completely in a burner with residual oxygen of the cathode off-gas, as a result of which off-gas is produced. The fuel cell system has an exhaust gas heat exchanger for cooling the exhaust gas, and a recirculation conveying device for recirculating anode off-gas or exhaust gas to the reforming apparatus. Here, the recirculation conveying device and the exhaust gas heat exchanger are connected to one another in a fluid-communicating manner via a common cooling circuit for respective cooling, which common cooling circuit has a central cooling fluid store as fluid source with a heat exchanger, and in which common cooling circuit cooling fluid can be circulated in a cooling line. Furthermore, the cooling circuit has at least one (in particular, controllable) pump for conveying cooling fluid. As a consequence, the regulation of the mass flow of the cooling fluid preferably takes place via a controllable pump. Another advantageous solution is a regulation via a regulating valve in combination with a pump.

It is particularly preferably provided that the central cooling fluid store is configured as a warm water store, and, via the common cooling circuit, the waste heat of the fuel cell system is effected via the warm water store with the heat exchanger.

Within the context of the invention, the recirculation conveying device can be configured, for example, as a recirculation fan, in order for it to be possible for the fuel cell system to be operated with recirculation, in particular with a return of anode off-gas. The recirculation fan can be subjected to temperatures of up to 600° C. during operation.

The cooling fluid can preferably be formed by way of water. For the use of air fans, depending on the application, the cooling can also take place by way of air cooling. In the case of the use of a recirculation fan, in particular, cooling by way of water as cooling fluid is to be preferred.

Within the context of the invention, exhaust gas will be understood to mean, in particular, anode and cathode off-gas or anode off-gas which is burned completely by way of cathode off-gas. It can also be the case, however, that exhaust gas is anode off-gas, or anode off-gas is exhaust gas.

Within the context of the invention, furthermore, hot anode off-gas is conveyed from the anode of the high temperature fuel cell in the anode off-gas line, in particular indirectly, to the exhaust gas heat exchanger. Downstream of the high temperature fuel cell, the hot anode off-gas is guided from the anode in the anode off-gas line to a burner. In the burner, the anode off-gas is oxidized with the oxygen of the cathode off-gas, and exhaust gas is produced. The exhaust gas is subsequently divided into two paths: both the air heat exchanger and the reforming apparatus are heated by way of the exhaust gas. The exhaust gas is mixed again downstream of said two components, and is conveyed into the exhaust gas heat exchanger. Here, the exhaust gas which is fed in can be cooled in the exhaust gas heat exchanger which is preferably operated in countercurrent, and can leave the exhaust gas heat exchanger again as cooled exhaust gas in an exhaust gas line. To this end, for example, the exhaust gas heat exchanger can be supplied with cooling fluid, in particular water, at a temperature of approximately 30° C., in order to cool the hot exhaust gas. Said low temperature of approximately 30° C. in the region of the exhaust gas heat exchanger in the cooling circuit is preferably selected, since this corresponds to the return temperature of modern warm water preparation systems and therefore high degrees of thermal efficiency can be achieved. Here, formation of condensate from the anode off-gas occurs in the region of the exhaust gas heat exchanger. This can be discharged, for example, or can be provided for subsequent steam reforming. In general, the cooling at a low temperature affords the advantage that the efficiency can be increased. Furthermore, a low temperature is required, in order to cool the exhaust gas as far as possible, in order that the operating temperatures of the components of the fuel cell system which follow downstream are not disadvantageously exceeded.

The invention has the advantage, furthermore, that the cooling circuit of the exhaust gas heat utilization means and the cooling circuit of the fan cooling of the recirculation conveying device are coupled to one another on account of the fluid-communicating connection of the recirculation conveying device and the exhaust gas heat exchanger. In other words, the cooling fluid which is used for cooling the recirculation conveying device is circulated in the same cooling circuit, by way of which the exhaust gas is also cooled. This has the advantage that a further pump and a further heat exchanger in a separate cooling circuit can be dispensed with as a result of the coupling according to the invention. Since it is well known that the transmission of heat in a heat exchanger is associated with losses, the heat losses can be reduced by way of a further heat exchanger in a separate cooling circuit being dispensed with. In this way, the efficiency of the cooling is generally increased by way of the coupling of the cooling means. Furthermore, costs for the fuel cell system can be saved significantly by way of a further pump and a further heat exchanger in a separate cooling circuit being dispensed with.

The invention has the advantage, furthermore, that the waste heat of the individual components, in particular of the recirculation conveying device, can be used, in order to provide more thermal energy in a downstream heating/warm water circuit or a heating/service water system, and therefore to increase the overall efficiency. Furthermore, the cooling according to the invention can ensure that, by way of example, the operating temperature of the anode off-gas in the recirculation conveying device does not become too high, in order to prevent damage and to ensure proper operation of the recirculation conveying device.

It can preferably be provided in the case of the fuel system according to the invention that the recirculation conveying device is arranged downstream of the exhaust gas heat exchanger in the cooling circuit, in particular is arranged directly downstream thereof, with the result that cooling fluid can be conveyed from the exhaust gas heat exchanger to the recirculation conveying device. In other words, the exhaust gas heat exchanger can represent the first component in the cooling circuit, the cooling fluid being conveyed by means of the pump directly from the cooling fluid store into the exhaust gas heat exchanger. From the exhaust gas heat exchanger, the cooling fluid can be conveyed in a downstream manner into the recirculation conveying device.

The upstream arrangement of the exhaust gas heat exchanger has the advantage that the cooling fluid at the lowest temperature in the cooling circuit, in particular approximately 30° C., is available as inlet temperature into the exhaust gas heat exchanger. An inlet temperature which is this low of the cooling fluid is no longer required for the cooling of the recirculation conveying device. In this way, efficient cooling of the exhaust gas heat exchanger can advantageously be achieved, and the water can be condensed out of the hot anode off-gas in an optimum manner. By way of example, the outlet temperature from the exhaust gas heat exchanger can be approximately 65° C. Overall, therefore, the temperature of the cooling fluid in an exhaust gas heat exchanger section of the cooling circuit, in which the exhaust gas heat exchanger is arranged, can lie in a temperature range from 30° C. to 65° C., the inlet temperature preferably lying in a range from 30° C. to 35° C., and the outlet temperature preferably lying in a range from 60° C. to 65° C. Depending on the type of downstream warm water consumer, the inlet and outlet temperatures can vary and can also be up to 90° C.

A fuel cell system according to the invention can particularly preferably be configured in such a way that that an exhaust fan is arranged in the cooling circuit between the exhaust gas heat exchanger and the recirculation conveying device, as a result of which the exhaust fan can be cooled by way of cooling fluid of the cooling circuit. In particular, the exhaust fan can be cooled by way of water of the cooling circuit, which is circulated in the cooling circuit. The use of an exhaust fan also enables, in particular, the operation of the fuel cell system under vacuum. The operation under vacuum has the advantage that, in the case of an unplanned failure of a component of the fuel cell system, no process gas can escape to the surrounding area or no process gas is output to the surrounding area, but rather air is sucked into the fuel cell system via the exhaust fan. The low inlet temperature of the cooling fluid of approximately 30° C. into the exhaust gas heat exchanger can achieve a situation where the exhaust gas can be cooled down to approximately 35° C. The arrangement of the exhaust fan between the exhaust gas heat exchanger and the recirculation conveying device in the cooling circuit therefore has the advantage that the temperature of the cooling fluid in the exhaust fan is higher than the temperature of the conveyed exhaust gas.

In an exhaust fan section of the cooling circuit, in which the exhaust fan is arranged, the temperature of the cooling fluid for cooling the exhaust fan in the operating state of the fuel cell system preferably has a value, in particular in the range from 35° C. to 65° C., which value exceeds the temperature of the anode off-gas. Since, during operation, the exhaust fan has to convey the anode off-gas which can have approximately 100% relative humidity, condensation can occur, in particular, if the exhaust fan is too cold locally. This is achieved by virtue of the fact that the temperature of the cooling fluid is warmer than the temperature of the conveyed exhaust gas. The advantage arises that it can thus be prevented that the dew point is undershot and therefore condensation occurs locally in the exhaust fan, which condensation would be damaging for the exhaust fan. The inlet temperature of the cooling fluid into the exhaust fan preferably lies at approximately 40° C.

It is generally possible for the components of the cooling circuit, such as the exhaust gas heat exchanger, the exhaust fan or the recirculation conveying device, to be arranged in the cooling circuit in such a way that a fixed inlet and outlet temperature can be set within the respective component of the cooling circuit. The order of the components of the cooling circuit can therefore be changed or set in a variable manner.

It is provided in one preferred embodiment that the recirculation conveying device is configured as a turbocompressor with a plain bearing system, the plain bearing system being connected for lubrication to a lubricant circuit, in particular an oil circuit. The use of the lubricant circuit has the advantage that bearing damage can be avoided and proper operation of the turbocompressor can be ensured.

It can be provided in one preferred embodiment that the lubricant circuit has a lubricant source, at least one lubricant pump and at least one lubricant heat exchanger, the lubricant heat exchanger being coupled to the cooling circuit, as a result of which the lubricant of the lubricant circuit can be cooled by way of the cooling fluid. In other words, the oil which is used by way of example can advantageously be recooled as lubricant for the plain bearing system by way of the cooling fluid, in particular the water, of the cooling circuit in the lubricant heat exchanger, in order that the oil does not overheat. In particular, the lubricant can be set to a temperature in the range from 60° C. to 80° C. by means of the cooling by way of the cooling fluid. This can efficiently avoid a situation where the lubricant decomposes or has thermal damage. Furthermore, it can be favorable if the lubricant circuit additionally supplies the or at least one recirculation conveying device with lubricant.

Furthermore, it can preferably be provided that the waste heat of the anode off-gas from the exhaust gas heat exchanger and the waste heat from the recirculation conveying device are transferred in a further heat exchanger to a heating/service water system for the utilization of the waste heat. For example, the heating/service water system can be formed by way of the central cooling fluid store and the associated heat exchanger. Here, the waste heat can be transferred internally in the heat exchanger. Here, further systems with a plurality of heat exchangers or components are conceivable, in order to remove the waste heat.

Furthermore, two pumps are preferably arranged in the cooling circuit, a first pump being arranged between the cooling fluid store and the exhaust gas heat exchanger, and a second pump being arranged between the lubricant heat exchanger and the exhaust fan, it being possible for the cooling fluid stream to be set by means of the pumps. If the fuel cell system is coupled, for example, to the heating/service water system, it can be necessary at defined operating points within the system for the mass flow of the cooling fluid to be regulated, in particular to be reduced. In this way, the temperature spread within the cooling circuit can be set efficiently and/or can be maintained during operation. By way of example, in the case of operating points of this type at the fans, in particular the exhaust fan or the recirculation conveying device, it can occur that the required mass flow of the cooling fluid is no longer achieved and the cooling of the fan does not function sufficiently. In order to avoid this, a cooling circulation circuit can be set in an optimum manner by means of a second pump in the cooling circuit, it being possible as required for the mass flow of the cooling fluid to be increased or decreased in the case of need. The cooling fluid store is configured, in particular, as a warm water store.

In accordance with a second aspect of the invention, the object is achieved by way of a method for cooling a fuel cell system as claimed in one of the preceding embodiments, the method comprising the following steps:

circulating of cooling fluid by means of the at least one pump in the cooling circuit;

conveying of cooling fluid from an exhaust gas heat exchanger to a recirculation conveying device.

This has the advantage that the fluid circuit of the anode off-gas heat utilization means and the fluid circuit of the fan cooling of the recirculation conveying device are coupled to one another on account of the fluid-communicating connection or conveying of cooling fluid from the exhaust gas heat exchanger to the recirculation conveying device. As a result of the coupling, a further pump and a further heat exchanger in two separate cooling circuits can be dispensed with, as a result of which the heat losses are reduced.

The method can preferably comprise, furthermore, the following step:

cooling of an exhaust fan between the exhaust gas heat exchanger and the recirculation conveying device by way of cooling fluid of the cooling circuit.

This has the advantage that the waste heat which is produced in the exhaust fan can also be used in the same cooling circuit. Furthermore, a low inlet temperature into the exhaust fan can be achieved by way of the arrangement of the exhaust fan in the cooling circuit between the exhaust gas heat exchanger and the recirculation conveying device, as a result of which an optimum operating temperature of the exhaust fan for ensuring the vacuum can be made possible.

In a further embodiment, the method can comprise, furthermore, the following step:

setting of the temperature of the cooling fluid in an exhaust fan section of the cooling circuit, in which the exhaust fan is arranged, to a value, in particular in the range from 35° C. to 65° C., which value exceeds the temperature of the anode off-gas.

The setting of the temperature in the exhaust fan section has the advantage that it can be prevented in this way that the dew point is undershot and therefore condensation occurs locally in the exhaust fan, which condensation would be damaging for the exhaust fan.

In a further embodiment, the method can comprise, furthermore, the following step:

coupling of the cooling circuit to a lubricant circuit, as a result of which a lubricant of the lubricant circuit is cooled by way of the cooling fluid.

Accordingly, it can be efficiently avoided that the lubricant is heated excessively, and/or decomposes and has thermal damage.

BRIEF DESCRIPTION OF THE SEVERAL VIEWS OF THE DRAWINGS

In the following text, the invention will be described in greater detail on the basis of non-restrictive exemplary embodiments which are shown in the figures, in which.

DESCRIPTION OF SPECIFIC EMBODIMENTS OF THE INVENTION

In the following figures, identical elements are labeled by way of identical designations for reasons of clarity.

Figure 1:
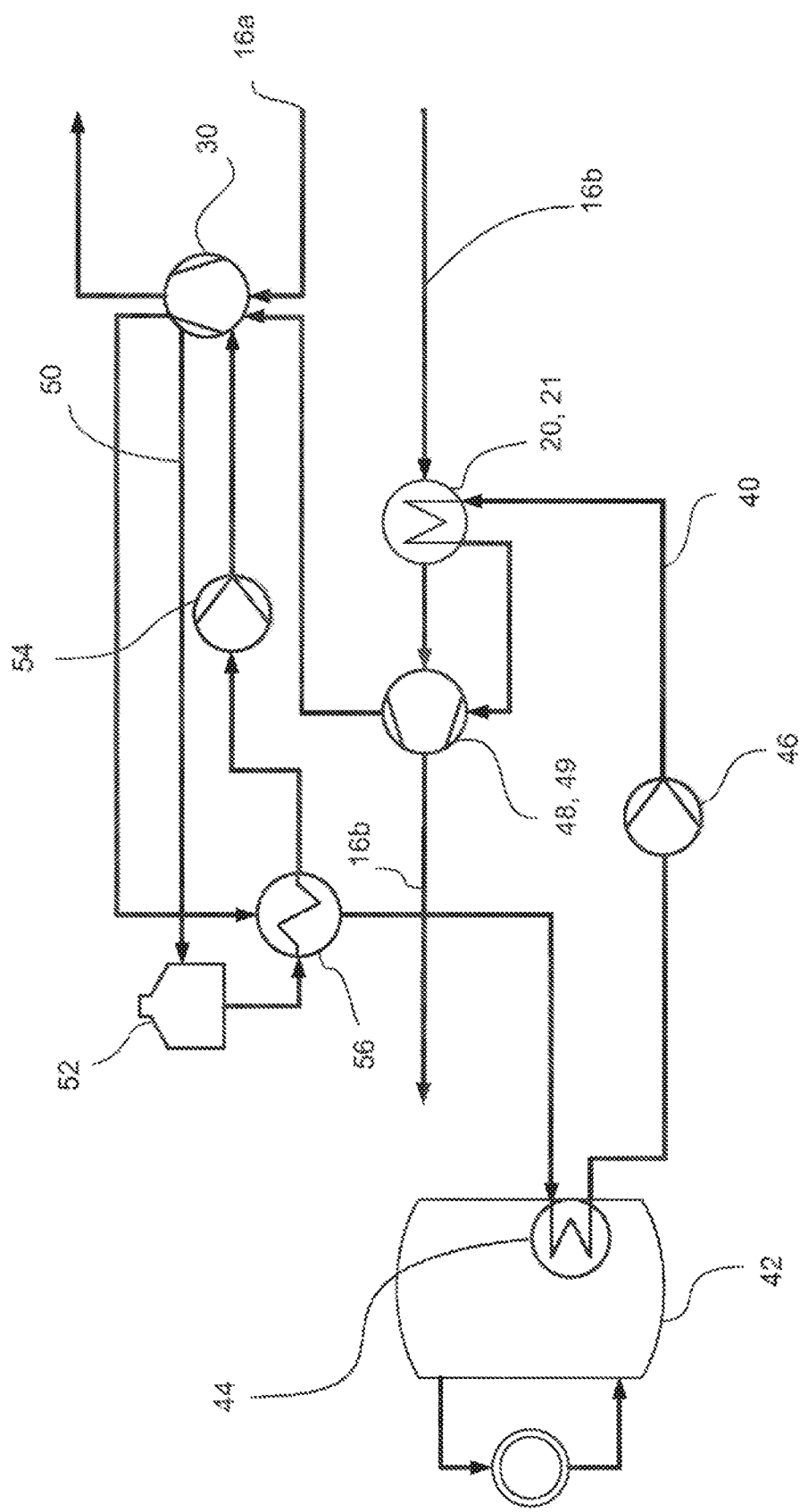
FIG. 1 shows a diagrammatic view of a first variant of a fuel cell system according to the invention.

FIG. 1 shows a diagrammatic view of a first exemplary embodiment of a fuel cell system according to the invention, the cooling circuit being shown in detail. The fuel cell system 10 has a fuel supply unit (not shown), at least one high temperature fuel cell 12 (not shown) with a cathode 14 and an anode 16, and an electrolyte 18 which is arranged between the cathode 14 and the anode 16. The cathode 14 has a cathode feed line 15 (not shown), it being possible for air or oxygen to be fed to the cathode 14. The anode 16 has an anode feed line 16a, the anode 16 being flow-connected via the anode feed line 16a to the fuel supply unit. A reforming apparatus 62 (not shown) is arranged in the anode feed line 16a. Furthermore, an anode off-gas line 16b for the discharge at least of anode off-gas from the anode 16 is provided. The anode off-gas line 16b and the anode feed line 16a can form an anode gas circuit.

The fuel cell system 10 has an exhaust gas heat exchanger 20 for cooling exhaust gas, and a recirculation conveying device 30 for returning anode off-gas to the reforming apparatus 62. The exhaust gas heat exchanger 20 is connected to the anode off-gas line 16b. Here, in particular, part of the anode off-gas is removed in the anode off-gas line 16b and leaves the anode gas circuit of the fuel cell system 10. The recirculation conveying device 30 is connected to the anode feed line 16a.

The recirculation conveying device 30 can be configured, for example, as a recirculation fan, in order for it to be possible for the fuel cell system 10 to be operated with recirculation, in particular with a return of anode off-gas. The recirculation fan can be subjected to temperatures of up to 600° C. during operation.

The recirculation conveying device 30 and the exhaust gas heat exchanger 20 are connected to one another in a fluid-communicating manner for respective cooling via a common cooling circuit 40. The cooling circuit 40 has a central cooling fluid store 42 which is configured as a warm water store, with a heat exchanger 44. Via the cooling fluid store 42, cooling fluid is recooled and provided via the heat exchanger, which cooling fluid can circulate in the cooling circuit 40. The warm water store and the heat exchanger 44 can also be configured as a heating/service water system in various arrangements. By way of example, a warm water store has been selected, in the case of which the hot cooling fluid in the upper region of the store is heated the warm water. In this example, the cooling fluid store 42 which is configured as a heat exchanger is configured in such a way that the cooling fluid is cooled to approximately 30° C. in the lower region of the warm water store 44 by way of the cold water from the warm water consumer.

The cooling fluid is conveyed by means of a pump 46 from the cooling fluid store 42 to the exhaust gas heat exchanger 20. Therefore, the pump 46 is arranged in the cooling circuit 40 between the cooling fluid store 42 and the exhaust gas heat exchanger 20. The cooling fluid is formed by way of example by water. The inlet temperature of the water into the exhaust gas heat exchanger 20 is preferably approximately 30° C. The hot anode off-gas is cooled by means of the water. The outlet temperature of the water from the exhaust gas heat exchanger 20 is approximately 65° C. Accordingly, the water temperature in the region of the exhaust gas heat exchanger section 21, in which the exhaust gas heat exchanger 20 is arranged, is in the range from 30° C. to 65° C.

The exhaust gas heat exchanger 20 is connected to the exhaust gas line 64b. The hot exhaust gas which is conveyed to the exhaust gas heat exchanger 20 is cooled by way of the water in the exhaust gas heat exchanger 20, and leaves the exhaust gas heat exchanger 20 as cooled exhaust gas in the exhaust gas line 64b. The low temperature of approximately 30° C. as inlet temperature in the region of the exhaust gas heat exchanger 20 in the cooling circuit 40 is required, in order to cool the exhaust gas to 35° C. and to achieve high efficiency. Here, a formation of condensate from the exhaust gas occurs in the region of the exhaust gas heat exchanger 20. Said condensate can be discharged, for example, or can be provided for subsequent steam reformation.

An exhaust fan 48 is arranged downstream of the exhaust gas heat exchanger 20 in the flow direction in the cooling circuit 40. By means of the exhaust fan 48, the fuel cell system 10 can be operated under vacuum. The exhaust fan 48 is cooled by way of water from the cooling circuit 40. The arrangement of the exhaust fan 48 downstream of the exhaust gas heat exchanger 20 in the flow direction in the exhaust gas path 64b has the advantage that a low inlet temperature into the exhaust fan 48 can be achieved as a result of the low outlet temperature of the exhaust gas from the exhaust gas heat exchanger section 21 of the cooling circuit 40 or the exhaust gas heat exchanger, as a result of which an optimum operating temperature of the exhaust fan 48 can be made possible in order to ensure the vacuum.

The temperature of the cooling fluid in an exhaust fan section 49 of the cooling circuit 40, in which the exhaust fan 48 is arranged, for cooling the exhaust fan 48 in the operating state of the fuel cell system 10 preferably has a value, in particular in the range from 35° C. to 65° C., which value exceeds the temperature of the exhaust gas. The setting of the temperature in the exhaust fan section 49 has the advantage that it can therefore be prevented that the dew point is undershot locally in the exhaust fan 48 and therefore condensation occurs which would be dangerous for the exhaust fan 48.

The recirculation conveying device 30 is arranged downstream of the exhaust fan 48 in the cooling circuit 40 in the flow direction. In other words, the exhaust fan 48 is arranged between the exhaust gas heat exchanger 20 and the recirculation conveying device 30. The recirculation conveying device 30 is configured by way of example as a turbocompressor with a plain bearing system, the plain bearing system being connected for lubrication to a lubricant circuit 50, in particular an oil circuit. The use of the lubricant circuit 50 has the advantage that bearing damage to the plain bearing system can be avoided and a sufficient service life of the turbocompressor can be ensured.

The lubricant circuit 50 has a lubricant source 52, a lubricant pump 54 and a lubricant heat exchanger 56. The lubricant heat exchanger 56 is coupled or connected to the cooling circuit 40, as a result of which the lubricant of the lubricant circuit 50 can be cooled by way of the water of the cooling circuit 40. In other words, the lubricant for the plain bearing system can be recooled, for example, by way of the water of the cooling circuit 40 in the lubricant heat exchanger 56, in order that the lubricant does not overheat. In particular, the lubricant can be set to a temperature in the range from 60° C. to 80° C. by means of the cooling by way of the water. In this way, it can be avoided efficiently that the lubricant decomposes or has thermal damage.

Following the lubricant heat exchanger 56, the water of the cooling circuit 40 can be conveyed back via the heat exchanger 44 into the cooling fluid store 42. It is conceivable that the order of the components of the cooling circuit 40 is changed.

It is preferably provided that the water is conveyed from the heat exchanger 44 in the warm water store 42 by means of the pump 46 via the exhaust gas heat exchanger 20, the exhaust fan 48 and the recirculation conveying device 30 to the lubricant heat exchanger 56 and back into the warm water store 42. A different order in the cooling circuit 40 can also be provided depending on the setting of the inlet and/or outlet temperature of the individual components.

On account of the fluid-communicating connection of the recirculation conveying device 30 and the exhaust gas heat exchanger 20, the cooling circuit of the anode off-gas heat utilization means and the cooling circuit of the fan cooling of the recirculation conveying device 30 can be coupled to one another in a central cooling circuit 40. In other words, the cooling fluid, that is to say the water which is used for cooling the recirculation conveying device 30, is circulated in the same cooling circuit 40, by way of which the anode off-gas is also cooled. This has the advantage that a further pump and a further heat exchanger in two separate cooling circuits can be dispensed with as a result of the coupling. Since it is well known that the transfer of heat in the heat exchanger entails losses, the heat losses can be reduced by way of a further heat exchanger in a separate cooling circuit being dispensed with. In this way, the efficiency of the cooling is generally increased by way of the coupling of the cooling.

Figure 2:
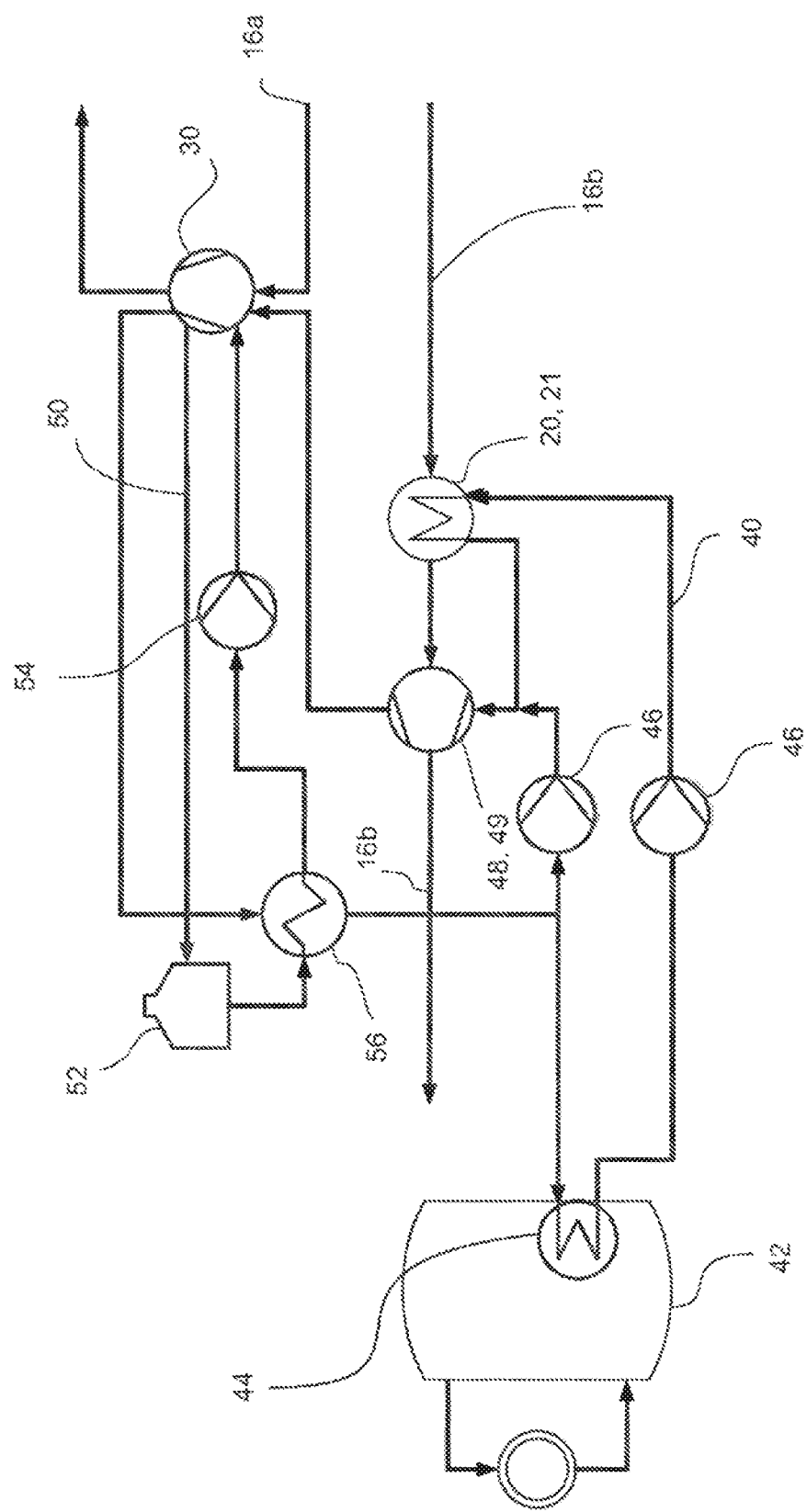
FIG. 2 shows a diagrammatic view of a second variant of a fuel cell system according to the invention.

FIG. 2 shows a diagrammatic view of a second exemplary embodiment of a fuel cell system according to the invention. The fuel cell system 10 is of analogous construction with respect to FIG. 1. In contrast to FIG. 1, a further pump 46 is arranged in the cooling circuit 40. By way of example, a first pump 46 is arranged between the cooling fluid store 42 and the exhaust gas heat exchanger 20, and a second pump 46 is arranged between the lubricant heat exchanger 56 and the exhaust fan 20, it being possible for the cooling fluid stream to be set by means of the pumps 46. If, for example, the fuel cell system 10 is coupled to a heating/service water system, it can be necessary at certain operating points within the system for the mass flow of the cooling fluid to be regulated, in particular to be reduced. In this way, the temperature spread within the cooling circuit 40 can be set efficiently and/or can be maintained during operation. By way of example, it can occur in the case of operating points of this type at the fans, in particular the exhaust fan 48 or the recirculation conveying device 30, that the required mass flow of the cooling fluid is no longer achieved and the cooling of the fan does not function sufficiently. In order to avoid this, a cooling circulation circuit can be set in an optimum manner by means of the second pump 46 in the cooling circuit 40, it being possible for the mass flow of the cooling fluid to be increased or decreased as required.

Figure 3:
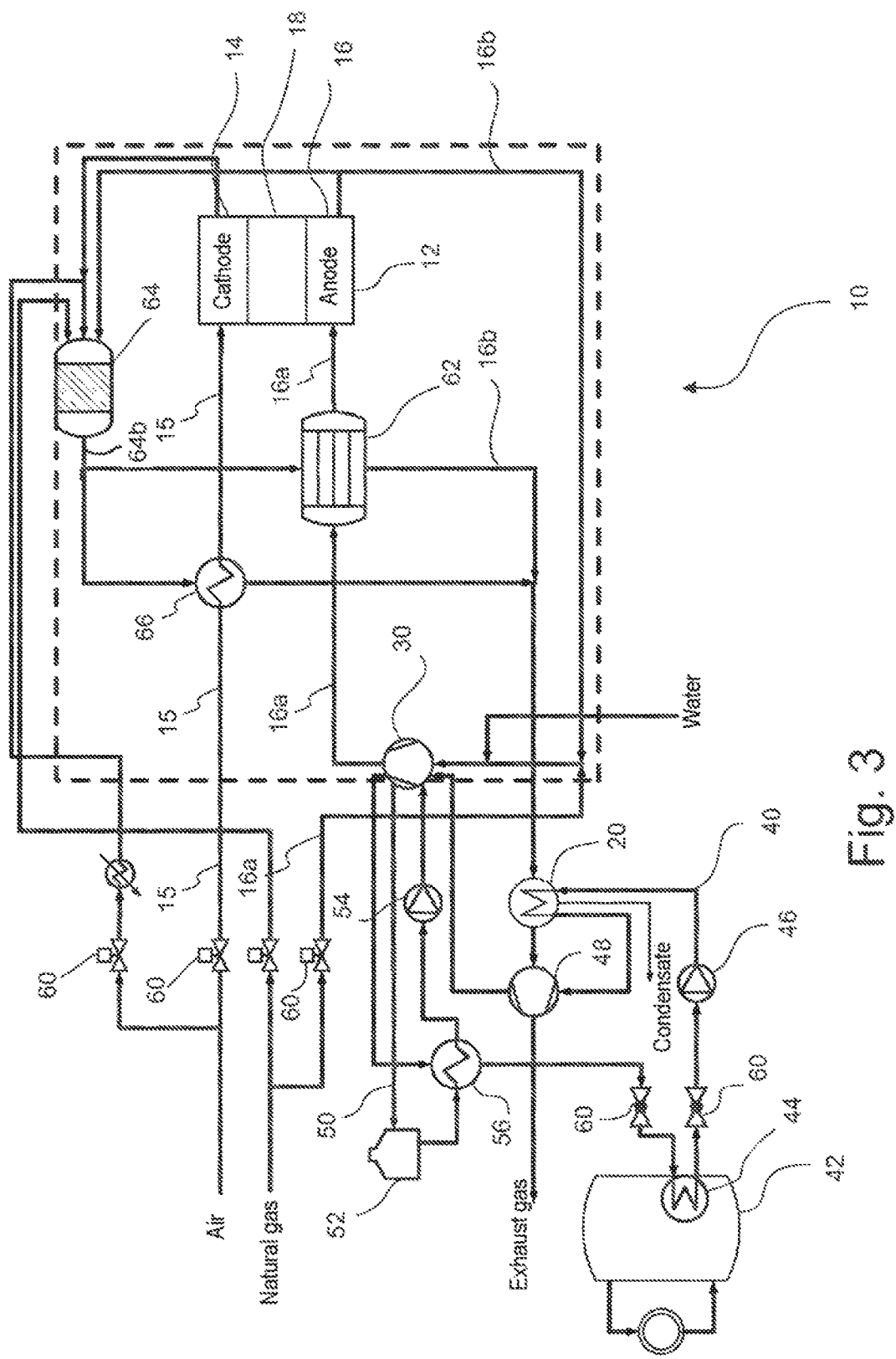
FIG. 3 shows a diagrammatic view in accordance with a third variant of a fuel cell system according to the invention.

FIG. 3 shows a diagrammatic view of the third exemplary embodiment of a fuel cell system according to the invention. In contrast to FIG. 1, FIG. 3 shows the entire fuel cell system 10. The fuel cell system 10 has a solid oxide fuel cell (SOFC). This is a high temperature fuel cell 12 which is operated at operating temperatures of approximately from 650° C. to 1000° C. An electrolyte 18 of said cell type can be formed from a solid ceramic material which is capable of conducting oxygen ions, but has an insulating effect for electrons. Electrodes, in particular a cathode 14 and an anode 16, are attached on the two sides of the electrolyte 18. They are gas-permeable electric conductors. The electrolyte 18 which conducts oxygen ions is provided, for example, as a thin membrane, in order for it to be possible for the oxygen ions to be transported with low energy.

Solid oxide fuel cells 12 are fuel cells for the continuous electrochemical current production, which are usually operated as fuel cell stacks, what are known as SOFC stacks, that is to say as a combination of a plurality of high temperature fuel cells 12. FIG. 3 illustrates only a single high temperature fuel cell 12 for improved clarity. The function of each fuel cell is based on a redox reaction, in the case of which reduction and oxidation take place in a spatially separated manner, namely at the interface between the respective electrode and the electrolyte 18. In the solid oxide fuel cell 12, said redox reaction is a reaction of oxygen with the fuel, for example natural gas which is fed in. An excess of oxygen prevails on the cathode side, whereas a lack of oxygen prevails on the anode side. As a result of said concentration gradient, oxygen diffuses from the cathode 14 through the electrolyte 18 to the anode 16. The electrolyte 18 is permeable only for oxygen ions.

When the oxygen molecule has reached the interface between the cathode 14 and the electrolyte 18, it absorbs two electrons, becomes an ion as a result, and can penetrate the barrier. When it arrives at the boundary to the anode 16, it reacts catalytically with the fuel gas with the output of heat and the corresponding products of combustion, and outputs two electrons again to the anode 16. A precondition for this is a flow of current.

The cathode 14 has a cathode feed line 15, by way of which air or oxygen can be fed to the cathode 14. To this end, a valve 60, in particular a throttle valve, is arranged in the cathode feed line 15 for feeding in the air or the oxygen. Furthermore, an air heat exchanger 66 is arranged in the cathode feed line 15 for the adaptation of the temperature of the air or the oxygen to the feed line to the cathode 14.

The anode 16 has an anode feed line 16a, the anode 16 being flow-connected via the anode feed line 16a to the fuel supply unit. By means of the anode feed line 16a, for example, natural gas as fuel can be fed to the anode 16. To this end, a valve 60 for the feeding in of the natural gas is arranged in the anode feed line 16a. The natural gas is conveyed in the anode feed line 16a to a recirculation conveying device 30. The recirculation conveying device 30 can be configured, for example, as a recirculation fan, in order for it to be possible for the fuel cell system 10 to be operated with recirculation, in particular with a return of anode off-gas. The recirculation fan can be subjected to temperatures of up to 600° C. during operation. Furthermore, a reforming apparatus 62 which is arranged downstream of the recirculation conveying device 30 in the flow direction is arranged in the anode feed line 16*a*. Here, the recirculation conveying device conveys the natural gas to the reforming apparatus 62. The reforming apparatus 62 can produce the reformate gas from a fuel, such as natural gas, and possibly from reformer air and/or water vapor. The reformate gas then comprises, inter alia, hydrogen gas and carbon monoxide, and is forwarded to the anode 16.

Furthermore, an anode off-gas line 16*b* is provided for the discharge at least of anode off-gas from the anode 16. The anode off-gas line 16*b* and the anode feed line 16*a* can form an anode gas circuit. Hot anode off-gas is conveyed in the anode off-gas line 16*b* to a burner 64. In the burner 64, the anode off-gas is oxidized with the oxygen of the cathode off-gas, and exhaust gas is produced. The exhaust gas from the burner 64 in the exhaust gas path 64*b* is also conveyed through the reforming apparatus 62 parallel to the cathode heat exchanger or air heat exchanger 66. The exhaust gas is subsequently mixed again and is conveyed into the exhaust gas heat exchanger 20, the exhaust gas which is fed in being cooled in the exhaust gas heat exchanger 20 which is preferably operated in countercurrent, and leaving the exhaust gas heat exchanger 20 again in the exhaust gas line 16*b*. Part of the anode off-gas passes into the anode feed line 16*a* and is conveyed therein as recirculated anode off-gas in the anode gas circuit and is mixed with fresh fuel in the reforming apparatus 62. To this end, for example, oxygen, natural gas, and off-gas products of the electrodes can be fed via a catalytic burner 64 to the reforming apparatus 62. The reforming side is preferably configured in such a way that the exhaust gas from the anode gas circuit is separated spatially, and the exhaust gas is used only as a heat exchange medium, in order to heat the reforming device 62.

The recirculation conveying device 30 and the exhaust gas heat exchanger 20 are connected to one another in a fluid-communicating manner for the respective cooling via a common cooling circuit 40. The cooling circuit is of analogous configuration with respect to FIG. 1. The cooling circuit 40 has a central cooling fluid store 42 which is configured as a warm water store as fluid source with a heat exchanger 44. Cooling fluid which can circulate in the cooling circuit 40 is provided via the cooling fluid store 42. The cooling fluid is conveyed by means of a pump 46 from the cooling fluid store 42 to the exhaust gas heat exchanger 20. Therefore, the pump 46 is arranged in the cooling circuit 40 between the cooling fluid store 42 and the exhaust gas heat exchanger 20. The cooling fluid is formed by way of example by water. The hot anode off-gas which is conveyed to the exhaust gas heat exchanger 20 is cooled by way of the water in the exhaust gas heat exchanger 20, and leaves the exhaust gas heat exchanger 20 as cooled anode off-gas in the anode off-gas line 16*b*.

An exhaust fan 48 is arranged downstream of the exhaust gas heat exchanger 20 in the flow direction in the cooling circuit 40. The fuel cell system 10 can be operated under vacuum by means of the exhaust fan 48. The exhaust fan 48 is cooled by way of water from the cooling circuit 40. The arrangement of the exhaust fan downstream of the exhaust gas heat exchanger 20 in the cooling circuit 40 has the advantage that a low inlet temperature into the exhaust fan 48 can be achieved as a result of the low temperature region in the exhaust gas heat exchanger section 21 of the cooling circuit 40, as a result of which an optimum operating temperature of the exhaust fan 48 can be made possible in order to ensure the vacuum.

The recirculation conveying device 30 is arranged downstream of the exhaust fan 48 in the flow direction in the cooling circuit 40. In other words, the exhaust fan 48 is arranged between the exhaust gas heat exchanger 20 and the recirculation conveying device 30. The recirculation conveying device 30 is configured by way of example as a turbocompressor with a plain bearing system, the plain bearing system being connected for lubrication to a lubricant circuit 50, in particular an oil circuit.

The lubricant circuit 50 has a lubricant source 52, a lubricant pump 54 and a lubricant heat exchanger 56. The lubricant heat exchanger 56 is coupled to the cooling circuit 40, as a result of which the lubricant of the lubricant circuit 50 can be cooled by way of the water of the cooling circuit 40. In other words, the lubricant for the plain bearing system can advantageously be recooled, for example, by way of the water of the cooling circuit 40 in the lubricant heat exchanger 56, in order that the lubricant does not overheat.

Subsequently, the water of the cooling circuit 40 can be conveyed back downstream of the lubricant heat exchanger 56 via the heat exchanger 44 into the cooling fluid store 42 which is configured as a warm water store. It is conceivable that the order of the components of the cooling circuit 40 is changed. It is preferably provided that the water is conveyed from the central cooling fluid store 42 by means of the pump 46 via the exhaust gas heat exchanger 20, the exhaust fan 48 and the recirculation conveying device 30 to the lubricant heat exchanger 56 and back into the cooling fluid store 42. Furthermore, the cooling circuit 40 has two valves 60 for setting the mass flow of the cooling fluid in the region of the central cooling fluid store 42. A different order of the components in the cooling circuit 40 can also be provided depending on the setting of the inlet and/or outlet temperature of the individual components.

LIST OF DESIGNATIONS

10 Fuel cell system
12 High temperature fuel cell
14 Cathode
15 Cathode feed line
16 Anode
16*a* Anode feed line
16*b* Anode off-gas line
18 Electrolyte
20 Exhaust gas heat exchanger
21 Exhaust gas heat exchanger section
30 Recirculation conveying device
40 Cooling circuit
42 Cooling fluid store, warm water store
44 Heat exchanger
46 Pump
48 Exhaust fan
49 Exhaust fan section
50 Lubricant circuit
52 Lubricant source
54 Lubricant pump
56 Lubricant heat exchanger
60 Valve
62 Reforming apparatus
64 Burner
64*b* Exhaust gas path
66 Air heat exchanger

What is claimed is:
1. A fuel cell system (10) comprising:
a fuel supply unit, at least one high temperature fuel cell (12) with a cathode (14) having a cathode feed line (15), and an anode (16) having an anode feed line (16a), wherein the anode (16) is flow-connected via the anode feed line (16a) to the fuel supply unit, an electrolyte (18) which is arranged between the cathode (14) and the anode (16), a reforming apparatus (62) being arranged in the anode feed line (16a), an anode off-gas line (16b) for the discharge of at least an anode off-gas from the anode (16), an exhaust gas heat exchanger (20) for cooling the anode off-gas, a recirculation conveying device (30) for returning anode off-gas to the reforming apparatus (62), the recirculation conveying device (30) being connected to the exhaust gas heat exchanger (20) in a fluid-communicating manner via a common cooling circuit (40) for respective cooling, said common cooling circuit (40) having a central cooling fluid store (42) as fluid source with a heat exchanger (44), wherein the common cooling circuit (40) has at least one pump (46) for conveying cooling fluid to allow circulation of the cooling fluid in a cooling line.

2. The fuel cell system as claimed in claim 1, characterized in that the recirculation conveying device (30) is arranged directly downstream of the exhaust gas heat exchanger (20) in the cooling circuit, with the result that cooling fluid is conveyed from the exhaust gas heat exchanger (20) to the recirculation conveying device (30).

3. The fuel cell system as claimed in claim 1, characterized in that an exhaust fan (48) is arranged in the cooling circuit (40) between the exhaust gas heat exchanger (20) and the recirculation conveying device (30), as a result of which the exhaust fan (48) can be cooled by way of cooling fluid of the cooling circuit (40).

4. The fuel cell system as claimed in claim 3, characterized in that, in an exhaust fan section (49) of the cooling circuit (40), in which the exhaust fan (48) is arranged, the temperature of the cooling fluid for cooling the exhaust fan (48) in the operating state of the fuel cell system has a value in the range from 35° C. to 65° C., which exceeds the temperature of the exhaust gas.

5. The fuel cell system as claimed in claim 1, characterized in that the recirculation conveying device (30) is configured as a turbocompressor with a plain bearing system, the plain bearing system being connected for lubrication to a lubricant circuit (50) comprising an oil circuit.

6. The fuel cell system as claimed in claim 5, characterized in that the lubricant circuit (50) has a lubricant source (52), at least one lubricant pump (54) and at least one lubricant heat exchanger (56), the lubricant heat exchanger (56) being coupled to the cooling circuit (40), as a result of which the lubricant of the lubricant circuit (50) can be cooled by way of the cooling fluid.

7. The fuel cell system as claimed in claim 5, characterized in that two pumps (46) are arranged in the cooling circuit (40), a first pump (46) being arranged between the cooling fluid store (42) and the exhaust gas heat exchanger (20), and a second pump (46) being arranged between the lubricant heat exchanger (56) and the exhaust fan (48), for circulation of the cooling fluid by the pumps (46).

8. A method for cooling a fuel cell system as claimed in claim 1, the method comprising the following steps:
    circulating of cooling fluid by means of the at least one pump (46) in the cooling circuit (40);
    conveying of cooling fluid from an exhaust gas heat exchanger (20) to a recirculation conveying device (30).

9. The method as claimed in claim 8, characterized in that the method comprises, furthermore, the following step:
    cooling of an exhaust fan (48) between the exhaust gas heat exchanger (20) and the recirculation conveying device (30) by way of cooling fluid of the cooling circuit (40).

10. The method as claimed in claim 8, characterized in that the method comprises, furthermore, the following step:
    setting of the temperature of the cooling fluid in an exhaust fan section (49) of the cooling circuit (40), in which the exhaust fan (48) is arranged, to a value in the range from 35° C. to 65° C., which exceeds the temperature of the anode off-gas.

11. The method as claimed in claim 8, characterized in that the method comprises, furthermore, the following step:
    coupling of the cooling circuit to a lubricant circuit, as a result of which a lubricant of the lubricant circuit (50) is cooled by way of the cooling fluid.

* * * * *